US011976438B2

United States Patent
Konda et al.

(10) Patent No.: US 11,976,438 B2
(45) Date of Patent: May 7, 2024

(54) LOADING MACHINE CONTROL DEVICE AND CONTROL METHOD

(71) Applicant: KOMATSU LTD., Tokyo (JP)

(72) Inventors: Tomoki Konda, Tokyo (JP); Kazuhiro Hatake, Tokyo (JP)

(73) Assignee: KOMATSU LTD., Tokyo (JP)

( * ) Notice: Subject to any disclaimer, the term of this patent is extended or adjusted under 35 U.S.C. 154(b) by 601 days.

(21) Appl. No.: 16/973,585

(22) PCT Filed: Jul. 18, 2019

(86) PCT No.: PCT/JP2019/028267
§ 371 (c)(1),
(2) Date: Dec. 9, 2020

(87) PCT Pub. No.: WO2020/044837
PCT Pub. Date: Mar. 5, 2020

(65) Prior Publication Data
US 2021/0254304 A1 Aug. 19, 2021

(30) Foreign Application Priority Data

Aug. 31, 2018 (JP) .................................. 2018-163417

(51) Int. Cl.
*E02F 3/32* (2006.01)
*E02F 3/43* (2006.01)
(Continued)

(52) U.S. Cl.
CPC ................ *E02F 3/439* (2013.01); *E02F 3/32* (2013.01); *E02F 9/2004* (2013.01);
(Continued)

(58) Field of Classification Search
CPC ... E02F 3/437; E02F 3/439; E02F 3/32; E02F 9/2041; E02F 9/2004; E02F 9/2033; E02F 9/205; B65G 6/00
(Continued)

(56) References Cited

U.S. PATENT DOCUMENTS 9,206,588 B2 * 12/2015 Wu .......................... B60L 50/15
10,494,792 B2 * 12/2019 Machida ................... B60R 1/00
(Continued)

FOREIGN PATENT DOCUMENTS

CN 104736773 A 6/2015
CN 105386394 A 3/2016
(Continued)

OTHER PUBLICATIONS

Andreev, Rodion. "Evaluation of hydraulic excavator and rope shovel major maintenance costs in operation." (Year: 2015).*
(Continued)

*Primary Examiner* — Cuong H Nguyen
(74) *Attorney, Agent, or Firm* — Global IP Counselors, LLP (57) ABSTRACT

A loading machine includes a swing body and work equipment attached to the swing body. The work equipment has a bucket. A control device of the loading machine includes an operation signal input unit that receives an input of a loading command signal from an operator, and an operation signal output unit. The operation signal output unit outputs operation signals of the work equipment and the swing body to move the bucket to a loading position above a loading target in a case in which the loading command signal is received. The operation signal output unit outputs a dumping operation signal to perform dumping to the bucket when the swing body faces a dump start azimuth direction that is closer to the swing body in a swing direction than an end (Continued)

point azimuth direction in which the swing body faces when the work equipment is positioned at the loading position.

4 Claims, 5 Drawing Sheets

(51) Int. Cl.
*E02F 9/20* (2006.01)
*B60K 35/00* (2006.01)
*E02F 9/26* (2006.01)

(52) U.S. Cl.
CPC ............ *E02F 9/2041* (2013.01); *B60K 35/00* (2013.01); *E02F 9/26* (2013.01)

(58) Field of Classification Search
USPC .................................................. 701/50, 34.2
See application file for complete search history.

(56) References Cited

U.S. PATENT DOCUMENTS

| | | | | |
|---|---|---|---|---|
| 10,767,347 | B2* | 9/2020 | Nishi | E02F 9/205 |
| 11,200,761 | B2* | 12/2021 | Onishi | E02F 9/2054 |
| 11,634,890 | B2* | 4/2023 | Tanimoto | E02F 9/264 |
| | | | | 701/34.2 |
| 2015/0142276 | A1* | 5/2015 | Wu | E02F 9/2095 |
| | | | | 701/50 |
| 2015/0240458 | A1* | 8/2015 | Nagato | E02F 9/264 |
| | | | | 701/32.7 |
| 2016/0052731 | A1 | 2/2016 | Berning et al. | |
| 2016/0053448 | A1 | 2/2016 | Berning et al. | |
| 2018/0080198 | A1* | 3/2018 | Machida | H04N 7/181 |
| 2018/0371723 | A1* | 12/2018 | Nishi | B64C 39/024 |
| 2019/0330825 | A1* | 10/2019 | Tanimoto | E02F 9/261 |
| 2020/0074766 | A1* | 3/2020 | Onishi | G07C 3/08 |
| 2020/0199853 | A1* | 6/2020 | Konda | E02F 9/265 |
| 2020/0246434 | A1* | 8/2020 | Bullens | A61K 9/0019 |
| 2020/0299929 | A1 | 9/2020 | Ohiwa et al. | |
| 2021/0002851 | A1 | 1/2021 | Morita | |

FOREIGN PATENT DOCUMENTS

| | | | | |
|---|---|---|---|---|
| CN | 105386395 A | 3/2016 | | |
| EP | 2 803 769 A1 | 11/2014 | | |
| JP | 52-64105 A | 5/1977 | | |
| JP | 64-90327 A | 4/1989 | | |
| JP | 9-195321 A | 7/1997 | | |
| JP | 9-256407 A | 9/1997 | | |
| JP | 11-124880 A | 5/1999 | | |
| JP | 2000-179008 A | 6/2000 | | |
| JP | 2001-123479 A | 5/2001 | | |
| JP | 2017-227012 A | 12/2017 | | |
| KR | 10-2014-0113660 A | 9/2014 | | |
| WO | WO-2018043301 A1 * | 3/2018 | | B60K 35/00 |
| WO | 2019/181872 A1 | 9/2019 | | |

OTHER PUBLICATIONS

Corke, Peter, Jonathan Roberts, Jock Cunningham, and David Hainsworth. "Mining Roboti." (Year: 2007).*
Nokka, Jarkko. "Energy efficiency analyses of hybrid non-road mobile machinery by real-time virtual prototyping." (Year: 2018).*
Kress, R. L., et al. Hydraulic manipulator design, analysis, and control at Oak Ridge National Laboratory. No. ORNL-TM-13300. Oak Ridge National Lab., (Year: 1996).*
The International Search Report for the corresponding international application No. PCT/JP2019/028267, dated Oct. 8, 2019.

* cited by examiner

LOADING MACHINE CONTROL DEVICE AND CONTROL METHOD

CROSS-REFERENCE TO RELATED APPLICATIONS

This application is a U.S. National stage application of International Application No. PCT/JP2019/028267, filed on Jul. 18, 2019. This U.S. National stage application claims priority under 35 U.S.C. § 119(a) to Japanese Patent Application No. 2018-163417, filed in Japan on Aug. 31, 2018, the entire contents of which are hereby incorporated herein by reference.

BACKGROUND

Field of the Invention

The present invention relates to a loading machine control device and a control method.

Background Information

Japanese Unexamined Patent Application, First Publication No. H09-256407 discloses a technique related to automatic loading control of a loading machine. The automatic loading control means control performed for moving a bucket to a loading point by receiving designation of the loading point from an operator or the like of a loading machine by a control device and by controlling an operation of the loading machine and work equipment using the control device. According to the technique of Japanese Unexamined Patent Application, First Publication No. H09-256407, the control device stores a time series of a position of the work equipment in advance and operates the work equipment according to the time series.

SUMMARY

According to the technique described in Japanese Unexamined Patent Application, First Publication No. H09-256407, the work equipment automatically moves to the loading point stored in advance, and dump is performed at the loading point. In addition, there is a desire to shorten the cycle time in automatic loading.

An object of the present invention is to provide a loading machine control device and a control method that can shorten a cycle time in automatic loading control.

A first aspect of the present invention provides a control device of a loading machine including a swing body that swings around a swing center and work equipment that has a bucket and is attached to the swing body, the control device including: an operation signal input unit configured to receive an input of a loading command signal from an operator; and an operation signal output unit configured to output operation signals of the work equipment and the swing body for moving the bucket to a loading position above a loading target in a case where the loading command signal is received and output a dumping operation signal for performing dumping to the bucket when the swing body faces a dump start azimuth direction that is closer to the swing body in a swing direction than an end point azimuth direction which is an azimuth direction in which the swing body faces when the work equipment is positioned at the loading position.

According to the above-described aspect, the loading machine control device can shorten the cycle time in the automatic loading control.

DETAILED DESCRIPTION OF EMBODIMENT(S)

Hereinafter, embodiments will be described with reference to the drawings.

First Embodiment (Configuration of Loading Machine)

Figure 1:
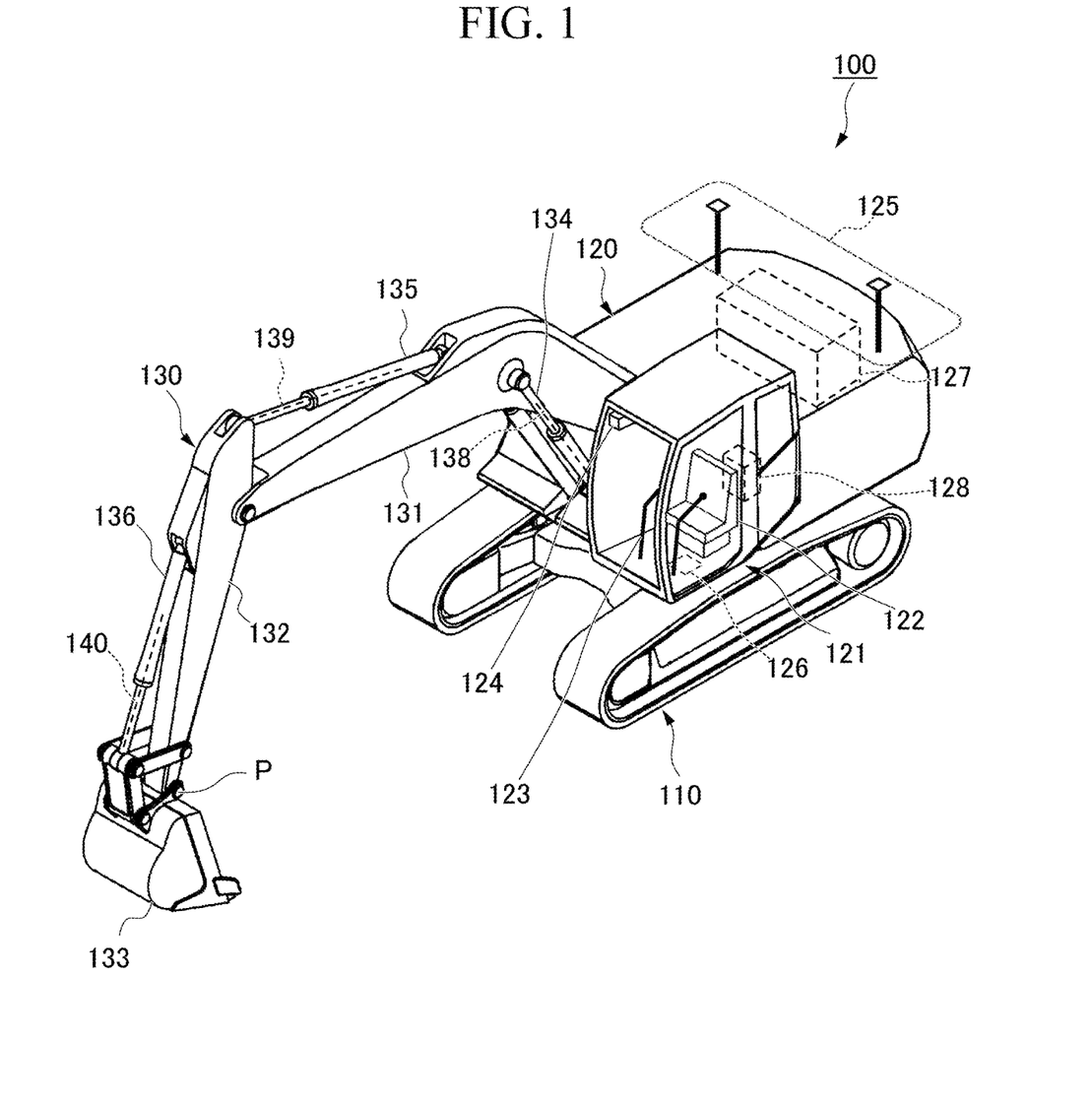
FIG. 1 is a schematic view showing a configuration of a loading machine according to a first embodiment.

FIG. 1 is a schematic view showing a configuration of a loading machine according to a first embodiment.

A loading machine 100 is a work machine for loading earth to a loading point, such as a transport vehicle. The loading machine 100 according to the first embodiment is a hydraulic excavator. The loading machine 100 according to another embodiment may be a loading machine other than the hydraulic excavator. In addition, although the loading machine 100 shown in FIG. 1 is a backhoe shovel, but may be a face shovel or a rope shovel.

The loading machine 100 includes a travel body 110, a swing body 120 supported by the travel body 110, and work equipment 130 operated by hydraulic pressure and supported by the swing body 120. The swing body 120 is supported so as to be swingable around a swing center.

The work equipment 130 includes a boom 131, an arm 132, a bucket 133, a boom cylinder 134, an arm cylinder 135, a bucket cylinder 136, a boom angle sensor 138, an arm angle sensor 139, and a bucket angle sensor 140.

A base end portion of the boom 131 is attached to the swing body 120 via a pin.

The arm 132 connects the boom 131 and the bucket 133 to each other. A base end portion of the arm 132 is attached to a tip end portion of the boom 131 via a pin.

The bucket 133 includes an edge for excavating earth or the like, and a container for transporting the excavated earth. A base end portion of the bucket 133 is attached to the tip end portion of the arm 132 via a pin.

The boom cylinder 134 is a hydraulic cylinder for operating the boom 131. A base end portion of the boom cylinder 134 is attached to the swing body 120. A tip end portion of the boom cylinder 134 is attached to the boom 131.

The arm cylinder 135 is a hydraulic cylinder for driving the arm 132. A base end portion of the arm cylinder 135 is attached to the boom 131. A tip end portion of the arm cylinder 135 is attached to the arm 132.

The bucket cylinder 136 is a hydraulic cylinder for driving the bucket 133. A base end portion of the bucket cylinder 136 is attached to the arm 132. A tip end portion of the bucket cylinder 136 is attached to a link mechanism that rotates the bucket 133.

The boom angle sensor 138 measures the stroke amount of the boom cylinder 134. The stroke amount of the boom cylinder 134 can be converted into the inclination angle of the boom 131 with respect to the swing body 120. Hereinafter, the inclination angle with respect to the swing body 120 is also referred to as an absolute angle. In other words, the stroke amount of the boom cylinder 134 can be converted into the absolute angle of the boom 131.

The arm angle sensor 139 measures the stroke amount of the arm cylinder 135. The stroke amount of the arm cylinder 135 can be converted into the inclination angle of the arm 132 with respect to the boom 131. Hereinafter, the inclination angle of the arm 132 with respect to the boom 131 is also referred to as a relative angle of the arm 132.

The bucket angle sensor 140 measures the stroke amount of the bucket cylinder 136. The stroke amount of the bucket cylinder 136 can be converted into the inclination angle of the bucket 133 with respect to the arm 132. Hereinafter, the inclination angle of the bucket 133 with respect to the arm 132 is also referred to as a relative angle of the bucket 133.

The loading machine 100 according to another embodiment may include an angle sensor that detects an inclination angle with respect to the horizontal plane or an inclination angle with respect to the swing body 120 instead of the boom angle sensor 138, the arm angle sensor 139, and the bucket angle sensor 140.

The swing body 120 is provided with a cab 121. Inside the cab 121, a driver seat 122 for an operator to sit on, an operating device 123 for operating the loading machine 100, and a detecting device 124 for detecting a three-dimensional position of an object that exists in a detection direction are provided. The operating device 123 generates a raising operation signal and a lowering operation signal of the boom 131, a pushing operation signal and a pulling operation signal of the arm 132, a dump operation signal and an excavation operation signal of the bucket 133, and a swing operation signal to the left and right of the swing body 120, in accordance with the operation of the operator, and outputs the generated signals to the control device 128. In addition, the operating device 123 generates a loading command signal for causing the work equipment 130 to start automatic loading control in accordance with the operation of the operator and outputs the generated loading command signal to the control device 128. The operating device 123 is configured with, for example, a lever, a switch, and a pedal. The loading command signal is generated by operating an automatic control switch. For example, when the switch is ON, a loading command signal is output. The operating device 123 is disposed in the vicinity of the driver seat 122. The operating device 123 is positioned within a range that can be operated by the operator when the operator sits on the driver seat 122.

Examples of the detecting device 124 include a stereo camera, a laser scanner, and an ultra-wide band (UWB) distance measuring device. The detecting device 124 is provided such that the detection direction faces the front of the cab 121 of the loading machine 100, for example. The detecting device 124 specifies the three-dimensional position of the object in a coordinate system with the position of the detecting device 124 as a reference.

In addition, the loading machine 100 according to the first embodiment is operated according to the operation of the operator who sits on the driver seat 122, but is not limited thereto in another embodiment. For example, the loading machine 100 according to another embodiment may be operated by transmitting an operation signal or a loading command signal by a remote operation of an operator who operates outside the loading machine 100.

The loading machine 100 includes a position and azimuth direction calculator 125, an inclination measuring instrument 126, a hydraulic device 127, and the control device 128.

The position and azimuth direction calculator 125 calculates a position of the swing body 120 and an azimuth direction in which the swing body 120 faces. The position and azimuth direction calculator 125 includes two receivers that receive positioning signals from artificial satellites that configure a GNSS. The two receivers are respectively installed at different positions on the swing body 120. Based on the positioning signal received by the receiver, the position and azimuth direction calculator 125 detects the position of the representative point (the origin of the excavator coordinate system) of the swing body 120 in a field coordinate system.

The position and azimuth direction calculator 125 calculates the azimuth direction in which the swing body 120 faces as a relationship between an installation position of one receiver and an installation position of the other receiver by using each positioning signal received by the two receivers. The azimuth direction in which the swing body 120 faces is the front direction of the swing body 120 and is equal to a horizontal component of the extending direction of a straight line that extends from the boom 131 of the work equipment 130 to the bucket 133.

The inclination measuring instrument 126 measures an acceleration and an angular speed of the swing body 120 and detects the posture (for example, roll angle and pitch angle) of the swing body 120 based on the measurement result. The inclination measuring instrument 126 is installed on a lower surface of the swing body 120, for example. For example, an inertial measurement unit (IMU) can be used as the inclination measuring instrument 126.

The hydraulic device 127 includes a hydraulic oil tank, a hydraulic pump, and a flow control valve. The hydraulic pump is driven by the power of an engine (not shown) and supplies the hydraulic oil to a traveling hydraulic motor (not shown) that causes the travel body 110 to travel via the flow control valve, a swing hydraulic motor (not shown) that swings the swing body 120, the boom cylinder 134, the arm cylinder 135, and the bucket cylinder 136. The flow control valve has a rod-shaped spool, and adjusts the flow rate of the hydraulic oil supplied to the traveling hydraulic motor, the swing hydraulic motor, the boom cylinder 134, the arm cylinder 135, and the bucket cylinder 136, according to the position of the spool. The spool is driven based on a control command received from the control device 128. In other words, the amount of hydraulic oil supplied to the traveling hydraulic motor, the swing hydraulic motor, the boom cylinder 134, the arm cylinder 135, and the bucket cylinder 136 is controlled by the control device 128. As described above, the boom cylinder 134, the arm cylinder 135, and the bucket cylinder 136 are driven by the hydraulic oil supplied from the common hydraulic device 127. In a case where the traveling hydraulic motor or the swing hydraulic motor is a swash plate type variable displacement motor, the control device 128 may adjust the rotation speed by the tilt angle of the swash plate.

The control device 128 receives the operation signal from the operating device 123. The control device 128 drives the work equipment 130, the swing body 120, or the travel body 110 based on the received operation signal.

(Configuration of Control Device)

Figure 2:
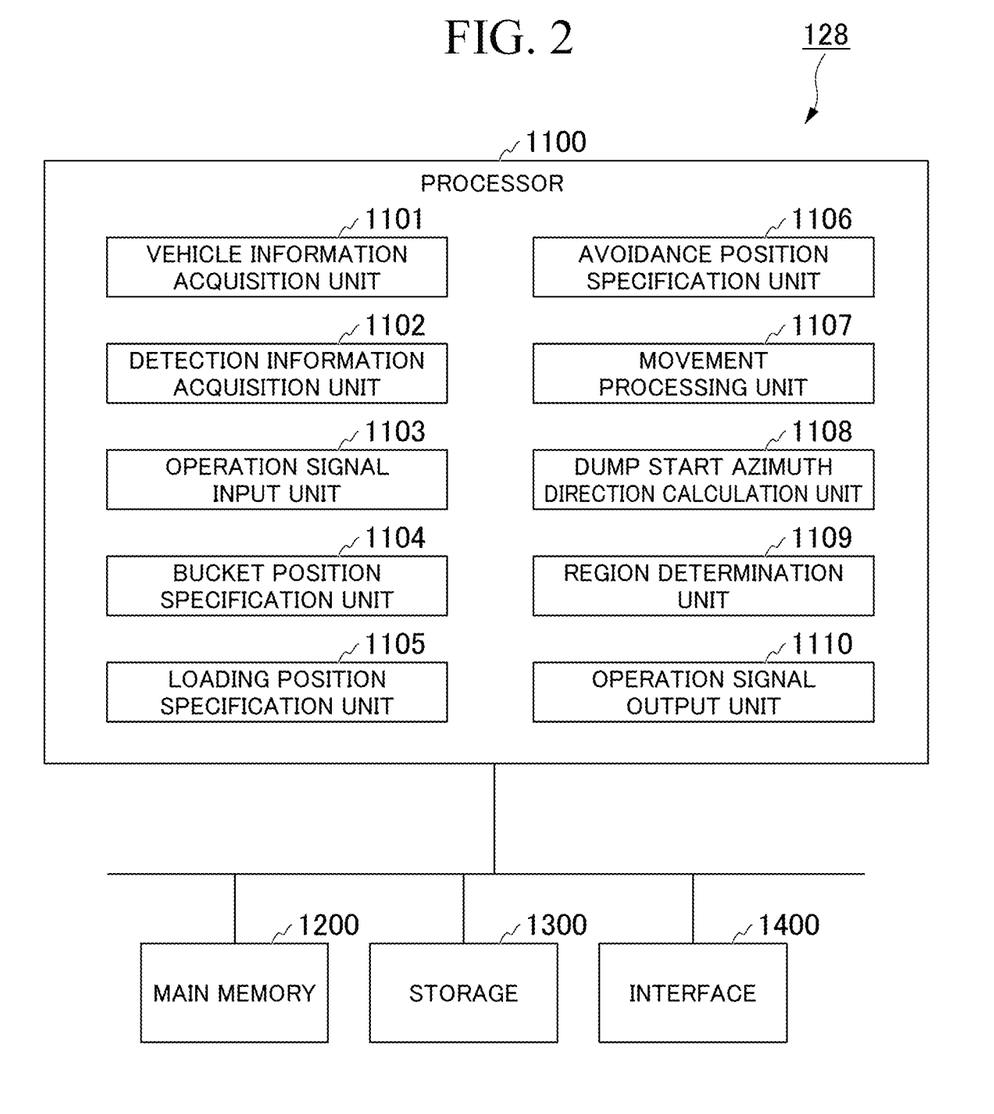
FIG. 2 is a schematic block diagram showing a configuration of a control device according to the first embodiment.

FIG. 2 is a schematic block diagram showing a configuration of the control device according to the first embodiment.

The control device 128 is a computer including a processor 1100, a main memory 1200, a storage 1300, and an interface 1400. The storage 1300 stores a program. The processor 1100 reads the program from the storage 1300, develops the program in the main memory 1200, and executes processing according to the program.

Examples of the storage 1300 include HDDs, SSDs, magnetic disks, magneto-optical disks, CD-ROMs, DVD-ROMs, and the like. The storage 1300 may be an internal medium directly connected to a common communication line of the control device 128, or may be an external medium connected to the control device 128 via the interface 1400. The storage 1300 is a tangible storage medium that is non-transitory.

The processor 1100 is executed by a program and includes a vehicle information acquisition unit 1101, a detection information acquisition unit 1102, an operation signal input unit 1103, a bucket position specification unit 1104, a loading position specification unit 1105, an avoidance position specification unit 1106, a movement processing unit 1107, a dump start azimuth direction calculation unit 1108, a region determination unit 1109, and an operation signal output unit 1110.

The vehicle information acquisition unit 1101 acquires the swing speed, position, and azimuth direction of the swing body 120, the inclination angles of the boom 131, the arm 132, and the bucket 133, and the posture of the swing body 120. Hereinafter, information on the loading machine 100 acquired by the vehicle information acquisition unit 1101 will be referred to as vehicle information.

The detection information acquisition unit 1102 acquires three-dimensional position information from the detecting device 124 and specifies the position and shape of the loading target 200 (for example, a transport vehicle or a hopper).

The operation signal input unit 1103 receives an input of the operation signal from the operating device 123. The operation signal includes the raising operation signal and the lowering operation signal of the boom 131, the pushing operation signal and the pulling operation signal of the arm 132, the dump operation signal and the excavation operation signal of the bucket 133, the swing operation signal of the swing body 120, the traveling operation signal of the travel body 110, and the loading command signal of the loading machine 100. The dump operation signal of the bucket 133 is an example of the dumping operation signal.

Based on the vehicle information acquired by the vehicle information acquisition unit 1101, the bucket position specification unit 1104 specifies a position P of the tip end portion of the arm 132 in the excavator coordinate system and a height Hb from the tip end of the arm 132 to the lowest passing point of the bucket 133. The lowest passing point of the bucket 133 is a point where teeth are positioned when the distance between the teeth and the ground surface is the shortest during the dump operation of the bucket 133. In other words, the height Hb from the tip end of the arm 132 to the lowest passing point of the bucket 133 coincides with the length from the pin at the base end portion of the bucket 133 to the teeth.

Figure 3:
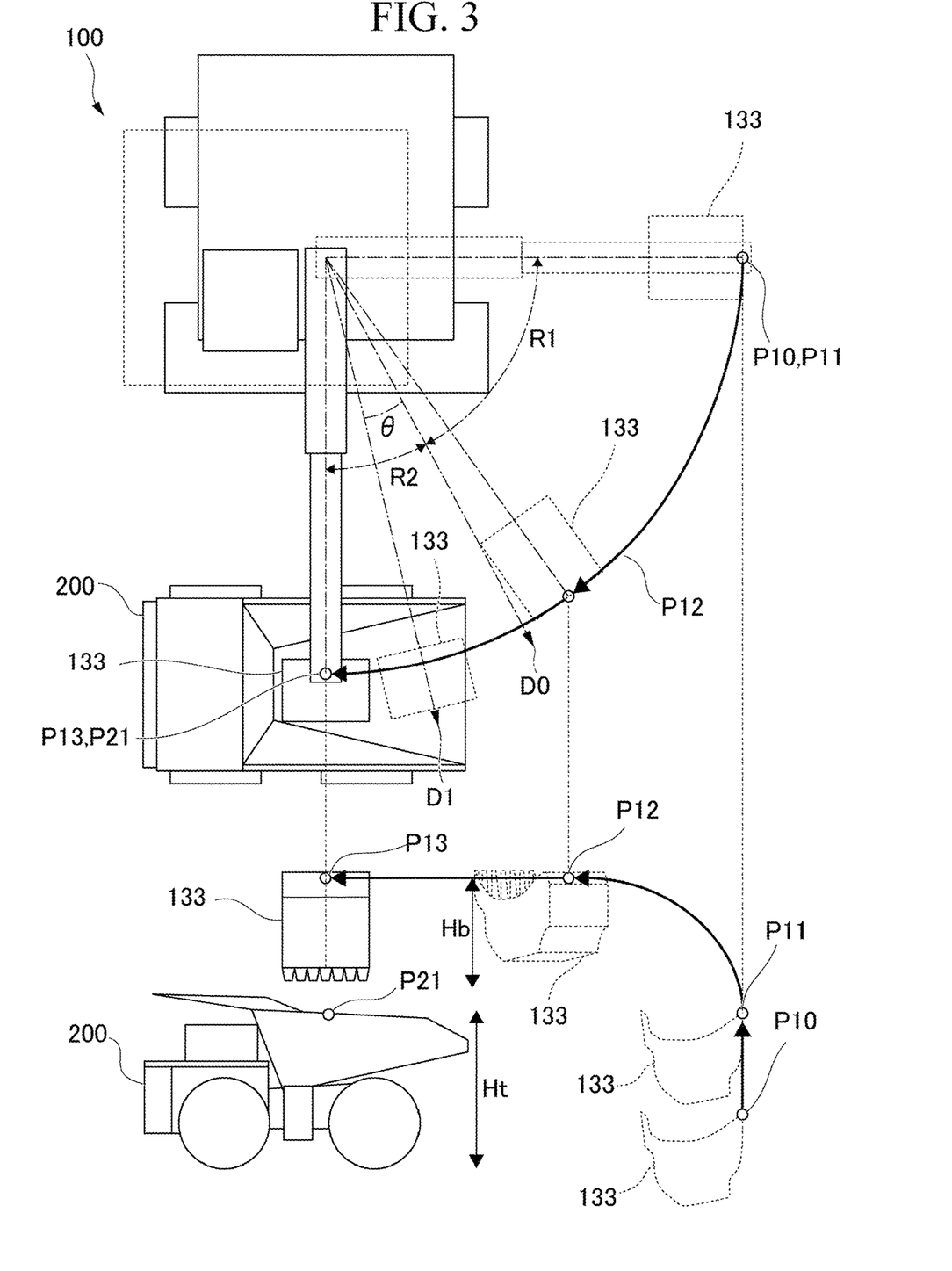
FIG. 3 is a view showing an example of a bucket path according to the first embodiment.

In particular, the bucket position specification unit 1104 specifies the position P of the tip end portion of the arm 132 when the input of the loading command signal is received, as an excavation completion position P10. FIG. 3 is a diagram showing an example of a bucket path according to the first embodiment.

Specifically, the bucket position specification unit 1104 specifies the position P of the tip end portion of the arm 132 by the following procedure. The bucket position specification unit 1104 obtains the position of the tip end portion of the boom 131 based on the absolute angle of the boom 131, which is acquired from the stroke amount of the boom cylinder 134, and the known length (distance from the pin at the base end portion to the pin at the tip end portion) of the boom 131. The bucket position specification unit 1104 obtains the absolute angle of the arm 132 based on the absolute angle of the boom 131 and the relative angle of the arm 132, which is obtained from the stroke amount of the arm cylinder 135. The bucket position specification unit 1104 obtains the position P of the tip end portion of the arm 132 based on the position of the tip end portion of the boom 131, the absolute angle of the arm 132, and the known length (distance from the pin at the base end portion to the pin at the tip end portion) of the arm 132.

The loading position specification unit 1105 specifies a loading position P13 based on the position and shape of the loading target 200 specified by the detection information acquisition unit 1102 in a case where the loading command signal is input to the operation signal input unit 1103. The loading position specification unit 1105 converts a loading point P21 indicated by the position information of the loading target 200 from the field coordinate system to the excavator coordinate system based on the position, azimuth direction, and posture of the swing body 120 acquired by the vehicle information acquisition unit 1101. The loading position specification unit 1105 specifies the specified loading point P21 as a plane position of the loading position P13. In other words, when the tip end of the arm 132 is positioned at the loading position P13, the tip end of the arm 132 is positioned above the loading point P21. Examples of the loading point P21 include the center point of the vessel in a case where the loading target 200 is a dump truck, and the center point of the opening in a case where the loading target 200 is a hopper. The loading position specification unit 1105 specifies a height of the loading position P13 by adding the height Hb from the tip end of the arm 132 specified by the bucket position specification unit 1104 to the lowest point of the bucket 133 and the height for the control margin of the bucket 133, to a height Ht of the loading target 200. In another embodiment, the loading position specification unit 1105 may specify the loading position P13 without adding the height for the control margin. In other words, the loading position specification unit 1105 may specify the height of the loading position P13 by adding the height Hb to the height Ht. The height Ht according to the first embodiment is the height from the ground to the upper surface of the vessel.

The avoidance position specification unit 1106 specifies an interference avoidance position P12 that is a point at which the work equipment 130 and the loading target 200 do not interfere with each other in a plan view from above based on the loading position P13 specified by the loading position specification unit 1105, the position of the loading machine 100 acquired by the vehicle information acquisition unit 1101, and the position and shape of the loading target 200 specified by the detection information acquisition unit 1102. The interference avoidance position P12 is a position at which the height thereof is the same height as that of the loading position P13, the distance from the swing center of the swing body 120 is equal to the distance from the swing center to the loading position P13, and the loading target 200 does not exist therebelow. The avoidance position specification unit 1106 specifies, for example, a circle of which the center is the swing center of the swing body 120 and of which the radius is the distance between the swing center and the loading position P13, and among the positions on the circle, specifies a position at which the outer shape of the bucket 133 does not interfere with the loading target 200 in a plan view from above and which is the closest to the loading position P13 as the interference avoidance position P12. The avoidance position specification unit 1106 can determine whether or not the loading target 200 and the bucket 133 interfere with each other based on the position and shape of the loading target 200 and the known shape of the bucket 133. Here, "the same height" and "the distances are equal" are not necessarily limited to cases where the heights or distances completely match each other and some errors and margins are allowed.

In a case where the operation signal input unit 1103 receives the input of the loading command signal, the movement processing unit 1107 generates the rotation operation signal for moving the bucket 133 to the loading position P13 based on the loading position P13 specified by the loading position specification unit 1105 and the interference avoidance position P12 specified by the avoidance position specification unit 1106. In other words, the movement processing unit 1107 generates the rotation operation signal so as to reach the loading position P13 from the excavation completion position P10 via a swing start position P11 and the interference avoidance position P12. Further, the movement processing unit 1107 generates the rotation operation signal of the bucket 133 such that a ground angle of the bucket 133 does not change even when the boom 131 and the arm 132 are driven. The operation signal generated by the movement processing unit 1107 is a signal for instructing to drive with the driving amount related to the operation signal input to the operation signal input unit 1103 when the lever or pedal of the operating device 123 is operated with the maximum operating amount. The driving amount is, for example, the amount of hydraulic oil or the opening degree of the spool.

In a case where the loading machine 100 is driven by the remote operation, the operation signal generated by the movement processing unit 1107 may be a signal for instructing to drive with a driving amount larger than the driving amount related to the maximum operating amount. This is because the loading machine 100 related to the remote operation is not limited by the riding comfort of the operator while the loading machine 100 related to a manned operation is limited by the maximum operating amount of the operating device 123 due to the riding comfort of the operator.

The dump start azimuth direction calculation unit 1108 calculates a dump start azimuth direction D0 based on the position of the loading target 200, the swing speed of the swing body 120, and the dump delay time from the output timing of the dump operation command of the bucket 133 to the timing when earth starts to be discharged. The dump start azimuth direction D0 is an azimuth direction in which earth is discharged to the loading target 200 without being spilled in a case where the dump operation command is output when the swing body 120 faces the azimuth direction during the swing of the swing body 120. The dump delay time of the bucket 133 is known for each model of the loading machine 100.

For example, the dump start azimuth direction calculation unit 1108 calculates the dump start azimuth direction D0 by the following procedure. The dump start azimuth direction calculation unit 1108 calculates the earth arrival time at which earth arrives the loading target 200 from the bucket 133 based on the distance from the lowest point of the bucket 133 to the loading target 200. The dump start azimuth direction calculation unit 1108 calculates a dump swing angle θ by multiplying the swing speed by the sum of the dump delay time and the earth arrival time. In a plan view from above, the dump start azimuth direction calculation unit 1108 calculates the azimuth direction rotated only by the dump swing angle θ to a closer side to the swing body in the swing direction, as the dump start azimuth direction D0, from an azimuth direction D1 in which the swing body 120 faces when the entire width of the teeth of the bucket 133 overlaps the loading target 200.

The region determination unit 1109 determines whether the azimuth direction in which the swing body 120 faces is in a first region R1 in which the dump operation is not executed or a second region R2 in which the dump operation is executed. The first region R1 is a region from the azimuth direction (starting point azimuth direction) in which the swing body 120 faces when the input of the loading command signal is received to the dump start azimuth direction D0. The second region R2 is a region from the dump start azimuth direction D0 to an azimuth direction (end point azimuth direction) in which the swing body 120 faces when the work equipment 130 is positioned at the loading position P13. The dump start azimuth direction D0 is always positioned closer to the swing body in the swing direction than the end point azimuth direction.

The operation signal output unit 1110 outputs the operation signal input to the operation signal input unit 1103 and the operation signal generated by the movement processing unit 1107. Specifically, the operation signal output unit 1110 outputs the operation signal related to the automatic control generated by the movement processing unit 1107 in a case where the automatic loading control is being performed, and outputs the operation signal related to the manual operation of the operator which is input to the operation signal input unit 1103 in a case where the automatic loading control is not being performed.

(Operation)

When the operator of the loading machine 100 determines that the loading machine 100 and the loading target 200 are in a positional relationship that allows loading processing, the operator turns on the automatic control switch of the operating device 123. Accordingly, the operating device 123 generates and outputs a loading command signal.

Figure 4:
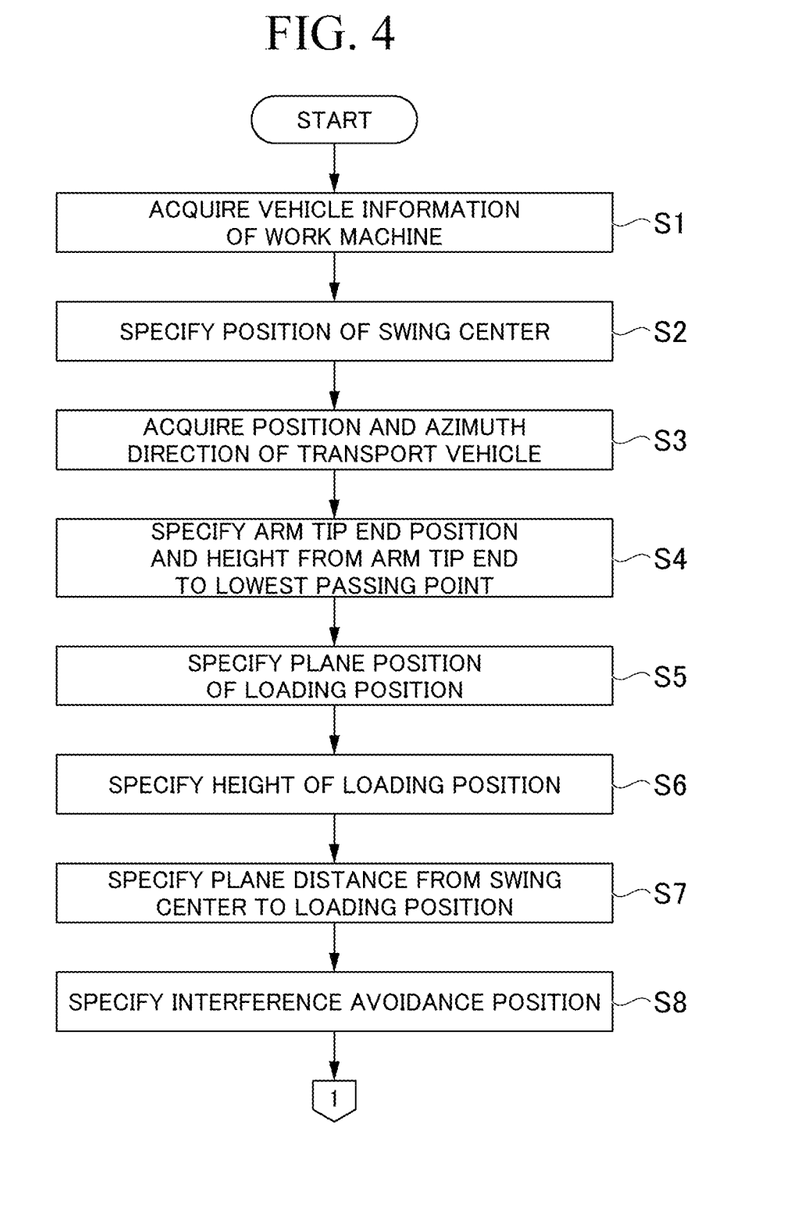
FIG. 4 is a flowchart showing an automatic loading control method according to the first embodiment.
Figure 5:
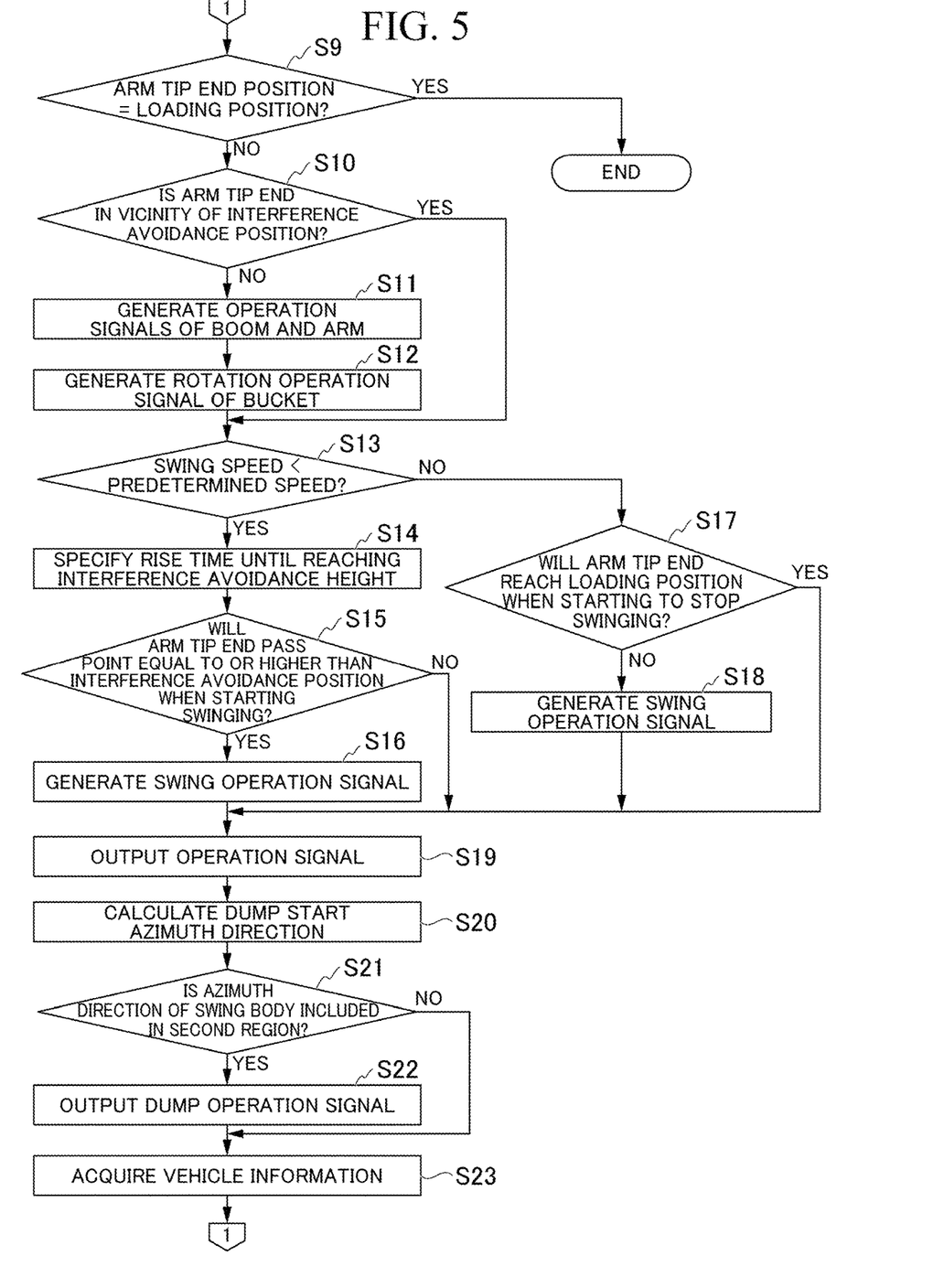
FIG. 5 is a flowchart showing the automatic loading control method according to the first embodiment.

FIGS. 4 and 5 are flowcharts showing the automatic loading control method according to the first embodiment. When receiving the input of the loading command signal from the operator, the control device 128 executes the automatic loading control shown in FIGS. 4 and 5.

The vehicle information acquisition unit 1101 acquires the position and azimuth direction of the swing body 120, the inclination angles of the boom 131, the arm 132, and the bucket 133, the posture of the swing body 120 (step S1). The vehicle information acquisition unit 1101 specifies the position of the swing center of the swing body 120 based on the acquired position and the azimuth direction of the swing body 120 (step S2). Then, the detection information acquisition unit 1102 acquires the three-dimensional position information of the loading target 200 from the detecting device 124 and specifies the position and shape of the loading target 200 from the three-dimensional position information (step S3).

Based on the vehicle information acquired by the vehicle information acquisition unit 1101, the bucket position specification unit 1104 specifies the position P of the tip end portion of the arm 132 when the loading command signal is input, and the height Hb from the tip end of the arm 132 to the lowest passing point of the bucket 133 (step S4). The bucket position specification unit 1104 specifies the position P as the excavation completion position P10.

The loading position specification unit 1105 converts the position information of the loading target 200 acquired by the detection information acquisition unit 1102 from the field coordinate system to the excavator coordinate system based on the position, azimuth direction, and posture of the swing body 120 acquired in step S1. The loading position specification unit 1105 specifies the plane position of the loading position P13 based on the position and shape of the loading target 200 specified by the detection information acquisition unit 1102 (step S5). At this time, the loading position specification unit 1105 specifies the height of the loading position P13 by adding the height Hb from the tip end portion of the arm 132 specified in step S4 to the lowest point of the bucket 133 and the height for the control margin of the bucket 133, to the height Ht of the loading target 200 (step S6).

The avoidance position specification unit 1106 specifies the plane distance from the position of the swing center of the swing body 120 specified in step S2 to the plane position of the loading position P13 (step S7). The avoidance position specification unit 1106 specifies the position separated from the swing center by the specified plane distance, that is, the position at which the outer shape of the bucket 133 does not interfere with the loading target 200 in a plan view and which is the closest to the loading position P13, as the interference avoidance position P12 (step S8).

The movement processing unit 1107 determines whether or not the position P of the tip end portion of the arm 132 has reached the loading position P13 (step S9). In a case where the position P of the tip end portion of the arm 132 has not reached the loading position P13 (step S9: NO), the movement processing unit 1107 determines whether or not the position P of the tip end portion of the arm 132 is in the vicinity of the interference avoidance position P12 (step S10). For example, the movement processing unit 1107 determines whether or not a difference between the height of the tip end of the arm 132 and the height of the interference avoidance position P12 is less than a predetermined threshold value, or a difference between the plane distance from the swing center of the swing body 120 to the tip end of the arm 132 and the plane distance from the swing center to the interference avoidance position P12 is less than a predetermined threshold value (step S10). In a case where the position P of the tip end portion of the arm 132 is not in the vicinity of the interference avoidance position P12 (step S10: NO), the movement processing unit 1107 generates the operation signal for raising the boom 131 and the arm 132 to the height of the interference avoidance position P12 (step S11). At this time, the movement processing unit 1107 generates the operation signal based on the positions and speeds of the boom 131 and the arm 132.

The movement processing unit 1107 calculates a sum of the angular speeds of the boom 131 and the arm 132 based on the generated operation signals of the boom 131 and the arm 132, and generates the operation signal for rotating the bucket 133 at the same speed as the sum of the angular speeds (step S12). Accordingly, the movement processing unit 1107 can generate the operation signal for holding the ground angle of the bucket 133. In another embodiment, the movement processing unit 1107 may generate the operation signal for rotating the bucket 133 such that the ground angle of the bucket 133 obtained by calculating from the detected values of the boom angle sensor 138, the arm angle sensor 139, and the bucket angle sensor 140 becomes equal to the ground angle when automatic control is started.

In a case where the position P of the tip end portion of the arm 132 is in the vicinity of the interference avoidance position P12 (step S10: YES), the movement processing unit 1107 does not generate the operation signals of the boom 131, the arm 132, and the bucket 133. In other words, in a case where the position P of the tip end portion of the arm 132 is in the vicinity of the interference avoidance position P12, the movement processing unit 1107 prohibits the output of the operation signal of the work equipment 130 for moving the work equipment 130 to the loading point.

The movement processing unit 1107 determines whether or not the swing speed of the swing body 120 is lower than a predetermined speed based on the vehicle information acquired by the vehicle information acquisition unit 1101 (step S13). In other words, the movement processing unit 1107 determines whether or not the swing body 120 is swinging.

In a case where the swing speed of the swing body 120 is lower than the predetermined speed (step S13: YES), the movement processing unit 1107 specifies a rise time which is time for the height of the bucket 133 to reach the height of the interference avoidance position P12 from the height of the excavation completion position P10 (step S14). In a case where the swing operation signal is output at the current timing based on the rise time of the bucket 133, the movement processing unit 1107 determines whether or not the tip end of the arm 132 will pass the interference avoidance position P12 or a point higher than the interference avoidance position P12 (step S15). In a case where the tip end of the arm 132 will pass the interference avoidance position P12 or the point higher than the interference avoidance position P12 when the swing operation signal is output at the current timing (step S15: YES), the movement processing unit 1107 generates the swing operation signal (step S16).

In a case where the tip end of the arm 132 will pass a point lower than the interference avoidance position P12 when the swing operation signal is output at the current timing (step S15: NO), the movement processing unit 1107 does not generate the swing operation signal. In other words, in a case where the tip end of the arm 132 will pass a point lower than the interference avoidance position P12, the movement processing unit 1107 prohibits the output of the swing operation signal.

In a case where the swing speed of the swing body 120 is equal to or higher than the predetermined speed (step S13: NO), and in a case where the output of the swing operation signal is stopped at the current timing, the movement processing unit 1107 determines whether or not the tip end of the arm 132 will reach the loading position P13 (step S17). After the output of the swing operation signal is stopped, the swing body 120 continues to swing due to inertia while decelerating, and then stops. In a case where the tip end of the arm 132 will reach the loading position P13 when the output of the swing operation signal is stopped at the current timing (step S17: YES), the movement processing unit 1107 does not generate the swing operation signal. In other words, in a case where the tip end of the arm 132 will reach the loading position P13 when the output of the swing operation signal is stopped at the current timing, the movement processing unit 1107 prohibits the output of the swing operation signal. Accordingly, the swing body 120 starts decelerating.

On the other hand, in a case where the tip end of the arm 132 will be stopped before reaching the loading position P13 when the output of the swing operation signal is stopped at the current timing (step S17: NO), the movement processing unit 1107 generates the swing operation signal (step S18).

When at least one of the rotation operation signals of the boom 131, the arm 132, and the bucket 133 and the swing operation signal of the swing body 120 is generated in the process from step S9 to step S18, the operation signal output unit 1110 outputs the generated operation signal to the hydraulic device 127 (step S19). Next, the dump start azimuth direction calculation unit 1108 calculates the dump start azimuth direction D0 based on the position of the loading target 200, the swing speed and the dump delay time of the swing body 120 (step S20). The region determination unit 1109 determines whether or not the azimuth direction in which the swing body 120 faces is included in the second region R2 from the dump start azimuth direction D0 to the end point azimuth direction (step S21). In a case where the azimuth direction in which the swing body 120 faces is included in the first region R1 (step S21: NO), the operation signal output unit 1110 does not output the dump operation signal of the bucket 133 to the hydraulic device 127. On the other hand, in a case where the azimuth direction in which the swing body 120 faces is included in the second region R2 (step S21: YES), the operation signal output unit 1110 outputs the dump operation signal of the bucket 133 to the hydraulic device 127 (step S22).

In a case where the azimuth direction in which the swing body 120 faces is included in the second region R2, the height of the tip end of the arm 132 becomes the height equal to or higher than the interference avoidance position P12. This is because, in steps S15 and S16, when the tip end of the arm 132 is positioned at the interference avoidance position P12 in a plan view from above, the movement processing unit 1107 generates the swing operation signal such that the height of the tip end of the arm 132 becomes equal to or higher than the interference avoidance position P12. The azimuth direction in which the swing body 120 faces when the tip end of the arm 132 is positioned at the interference avoidance position P12 in a plan view from above is positioned closer to the swing body in the swing direction than the dump start azimuth direction D0.

In a case where the azimuth direction in which the swing body 120 faces is included in the first region R1, the height of the tip end of the arm 132 is not necessarily limited to the height less than the interference avoidance position. For example, in a case where the time required to raise the height of the arm 132 to the height equal to or higher than the interference avoidance position P12 is shorter than the time required to swing the swing body 120 until the tip end of the arm 132 is positioned at the interference avoidance position P12 in a plan view from above, when the height of the tip end of the arm 132 rises to the height equal to or higher than the interference avoidance position P12, there is a possibility that the azimuth direction in which the swing body 120 faces is included in the first region R1.

Then, the vehicle information acquisition unit 1101 acquires the vehicle information (step S23). Accordingly, the vehicle information acquisition unit 1101 can acquire the vehicle information after operating by the output operation signal. The control device 128 returns the process to step S9, and repeatedly executes the generation of the operation signal.

On the other hand, in step S9, in a case where the position P of the tip end portion of the arm 132 has reached the loading position P13 (step S9: YES), the control device 128 ends the automatic loading control.

Here, an operation of the loading machine 100 at the time of the automatic loading control will be described using FIG. 3.

When the automatic loading control is started, the boom 131 and the arm 132 rise from the excavation completion position P10 toward the swing start position P11. At this time, the bucket 133 is driven so as to maintain the ground angle at the end of excavation.

In the control device 128, when the tip end of the arm 132 reaches the swing start position P11, the swing body 120 starts swinging toward the loading position P13. At this time, since the tip end of the arm 132 has not reached the height of the interference avoidance position P12, the boom 131 and the arm 132 continue to rise. While the tip end of the arm 132 moves from the swing start position P11 to the interference avoidance position P12, the boom 131, the arm 132, and the bucket 133 are decelerated such that the height of the tip end of the arm 132 becomes equal to the interference avoidance position P12.

When the tip end of the arm 132 reaches the interference avoidance position P12, the driving of the boom 131 and the arm 132 is stopped. In addition, the swing body 120 continues swinging. In other words, between the interference avoidance position P12 and the loading position P13, the tip end of the arm 132 moves only by swinging the swing body 120 without driving the boom 131 and the arm 132. While the tip end of the arm 132 moves from the swing start position P11 to the loading position P13, the swing body 120 is decelerated such that the position P of the tip end portion of the arm 132 becomes equal to the loading position P13.

While the tip end of the arm 132 is moving from the swing start position P11 to the loading position P13, the swing body 120 faces the dump start azimuth direction D0. At this time, the control device 128 starts the output of the dump operation signal to the bucket 133. The swing body 120 continues swinging, and when the dump delay time elapses from the output timing of the dump operation signal, the bucket 133 starts to rotate in the dump direction, and earth starts to be discharged from the bucket 133. When earth starts to be discharged, the azimuth direction in which the swing body 120 faces is closer to the swing body in the swing direction than the azimuth direction D1 in which the width of the teeth of the bucket 133 overlaps the loading target 200. Earth discharged from the bucket reaches the height of the loading target 200 after the earth arrival time. Since the loading machine 100 discharges earth while swinging, earth discharged from the bucket 133 draws a parabola having a horizontal speed component in the tangential direction by inertia that corresponds to the swing speed and drops to be closer to the far side of the swing direction than the dump starting point. In other words, the dump start azimuth direction D0 is an azimuth direction in which the bucket 133 is deviated from immediately above the loading target 200, but when the swing body 120 starts the output of the dump operation signal when facing the dump start azimuth direction D0, earth is accommodated in the loading target 200 due to the dump delay time and the horizontal speed component of earth. Therefore, the control device 128 can load earth on the loading target 200 without spilling by starting the output of the dump operation signal to the bucket 133 when the swing body 120 faces the dump start azimuth direction D0.

When the tip end of the arm 132 reaches the loading position P13 and the dump operation of the bucket 133 is completed, the driving of the work equipment 130 and the swing body 120 is stopped.

By the above-described automatic loading control, the loading machine 100 can load earth scooped by the bucket 133 into the loading target 200. The operator repeatedly executes excavation by the work equipment 130 and the automatic loading control by inputting the loading command signal to the extent that the loading capacity of the loading target 200 does not exceed the maximum loading capacity.

(Action and Effect)

As described above, the control device 128 of the loading machine 100 according to the first embodiment outputs the dump operation signal of the bucket 133 to the hydraulic device 127 when the swing body 120 faces the dump start azimuth direction D0 that is closer to the swing body in the swing direction than the end point azimuth direction during the automatic loading control. Accordingly, the control device 128 can start dumping before the bucket 133 reaches the loading position P13, and the cycle time of the loading processing can be shortened. The control device 128 according to the first embodiment determines whether or not to output the dump operation signal based on whether the azimuth direction of the swing body is included in the first region or the second region, but the invention is not limited thereto. For example, the control device 128 according to another embodiment may determine whether or not to output the dump operation signal based on whether or not the azimuth direction of the swing body exceeds the dump start azimuth direction D0.

The dump start azimuth direction D0 according to the first embodiment is the azimuth direction closer to the swing body in the swing direction than the azimuth direction D1 in which the swing body 120 faces when the width of the teeth of the bucket 133 and the loading target 200 overlap each other in a plan view from above. Accordingly, the control device 128 can advance the output start timing of the dump operation signal and shorten the cycle time. On the other hand, the present embodiment is not limited thereto, and the control device 128 may start the output of the dump operation signal when the width of the teeth of the bucket 133 and the loading target 200 overlap each other in a plan view from above. In this case, the control device 128 can reliably prevent earth from being spilled from the loading target 200.

The control device 128 according to the first embodiment calculates the dump start azimuth direction D0 based on the position of the loading target 200 and the swing speed of the swing body 120. Accordingly, the control device 128 can appropriately determine the output start timing of the dump operation signal in accordance with the swing speed of the swing body 120. In another embodiment, the present invention is not limited thereto, and the control device 128 may start the output of the dump operation signal based on the predetermined dump start azimuth direction D0.

Above, the embodiment has been described in detail with reference to the drawings, but the specific configuration is not limited to the above-described configuration, and various design changes can be made.

For example, in the first embodiment, the dump start azimuth direction D0 is set to the position calculated based on the position of the loading target 200, and the swing speed, the dump delay time, and the earth arrival time of the swing body 120, the invention is not limited thereto. For example, in another embodiment, the dump start azimuth direction D0 may be calculated without taking into account the dump delay time or the earth arrival time. In another embodiment, the dump start azimuth direction D0 may be an azimuth direction closest to the starting point azimuth direction among the azimuth directions in which the tip end of the arm 132 interferes with the loading target 200 in a plan view from above. In another embodiment, the dump start azimuth direction D0 may be set to any azimuth direction on the starting point azimuth direction side among the azimuth directions in which the tip end of the arm 132 interferes with the loading target 200 in a plan view from above. In another embodiment, the dump start azimuth direction D0 may be set to any azimuth direction on the end point azimuth direction side among the azimuth directions in which the tip end of the arm 132 does not interfere with the loading target 200 in a plan view from above. In another embodiment, the dump start azimuth direction D0 may be set to the azimuth direction in which the swing body faces when the tip end of the arm 132 is positioned at the interference avoidance position P12.

In addition, although the loading machine 100 according to the first embodiment includes the bucket 133, but the invention is not limited thereto. For example, the loading machine 100 according to another embodiment may include a clam bucket that can open and close the backhoe and the clam shell. The dumping operation signal in this case is an operation signal for rotating the clam shell.

Although the loading machine 100 according to the first embodiment is a manned driving vehicle which an operator boards and operates, but the invention is not limited thereto. For example, the loading machine 100 according to another embodiment is a remotely operated vehicle that is operated by an operation signal acquired by communication from a remote operating device that is operated by an operator in a remote office while looking at a monitor screen. In this case, some functions of the control device 128 may be provided in the remote operating device. Further, the loading machine 100 according to the first embodiment performs the control shown in FIGS. 4 and 5 in the automatic loading control, but the invention is not limited thereto. For example, in the loading machine 100 according to another embodiment, the control shown in FIGS. 4 and 5 may be applied to the automatic excavation and loading control in which the excavation work and the loading work are repeatedly and automatically performed.

The loading machine control device according to the present invention can shorten the cycle time in the automatic loading control.

The invention claimed is:

1. A control device of a loading machine including a swing body swingable around a swing center and work equipment having a bucket and being attached to the swing body, the control device comprising:
    an operation signal input unit configured to receive an input of a loading command signal from an operator; and
    an operation signal output unit configured to
        output operation signals of the work equipment and the swing body to move the bucket to a loading position above a loading target in a case in which the loading command signal is received, and
        output a dumping operation signal to perform dumping to the bucket when the swing body faces a dump start azimuth direction that is closer to the swing body in a swing direction than an end point azimuth direction in which the swing body faces when the work equipment is positioned at the loading position.

2. The control device of a loading machine according to claim 1, wherein
the dump start azimuth direction is closer to the swing body in the swing direction than an azimuth direction in which the swing body faces when the entire bucket and the loading target overlap each other as seen in a plan view from above.

3. The control device of a loading machine according to claim 1, further comprising:
a dump start azimuth direction calculation unit configured to calculate the dump start azimuth direction based on
a position of the loading target and
a swing speed of the swing body.

4. A control method of a loading machine including a swing body swingable around a swing center and work equipment having a bucket and being attached to the swing body, the control method comprising:
receiving an input of a loading command signal from an operator;
outputting operation signals of the work equipment and the swing body to move the bucket to a loading position above a loading target in a case in which the loading command signal is received; and
outputting a dumping operation signal to perform dumping to the bucket when the swing body faces a dump start azimuth direction that is closer to the swing body in a swing direction than an end point azimuth direction in which the swing body faces when the work equipment is positioned at the loading position.

* * * * *